(12) United States Patent
Hiranaka et al.

(10) Patent No.: US 8,910,794 B2
(45) Date of Patent: Dec. 16, 2014

(54) METHOD FOR REMOVING METAL PIECES FROM GYPSUM BOARD WASTES

(75) Inventors: Shingo Hiranaka, Shunan (JP); Genji Taga, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 343 days.

(21) Appl. No.: 13/546,361

(22) Filed: Jul. 11, 2012

(65) Prior Publication Data

US 2013/0014623 A1    Jan. 17, 2013

(30) Foreign Application Priority Data

Jul. 12, 2011    (JP) .................................. 2011-153726

(51) Int. Cl.
*B03C 1/00*    (2006.01)
*B03C 1/14*    (2006.01)

(52) U.S. Cl.
CPC ............... *B03C 1/14* (2013.01); *B03C 2201/20* (2013.01); *Y10S 209/93* (2013.01)
USPC ............. 209/223.2; 209/3; 209/214; 209/930

(58) Field of Classification Search
USPC ............... 209/3, 214, 223.1, 223.2, 225, 631, 209/636, 930
See application file for complete search history.

(56) References Cited

U.S. PATENT DOCUMENTS

| | | | |
|---|---|---|---|
| 4,834,870 A * | 5/1989 | Osterberg et al. ................ | 209/38 |
| 5,394,991 A * | 3/1995 | Kumagai et al. ............... | 209/212 |
| 7,726,493 B2 * | 6/2010 | Van Der Weijden et al. . | 209/218 |
| 2009/0188844 A1 * | 7/2009 | Davis et al. .................... | 209/659 |
| 2010/0044278 A1 * | 2/2010 | Harmon ......................... | 209/3.1 |
| 2011/0073529 A1 * | 3/2011 | Sprouse et al. ................... | 209/3 |
| 2012/0085685 A1 * | 4/2012 | Rem et al. ........................ | 209/39 |

* cited by examiner

*Primary Examiner* — Joseph C Rodriguez
(74) *Attorney, Agent, or Firm* — Birch, Stewart, Kolasch & Birch, LLP

(57) ABSTRACT

A method for removing metal pieces contained in gypsum board wastes from the gypsum board wastes by means of a drum magnetic separator, wherein
the method comprises the step of dropping cut pieces obtained by cutting the gypsum board wastes at fixed intervals "D" on the drum magnetic separator at a drop height "h"; and the drop height "h" is 0.8 to 3 times the interval "D".

4 Claims, 2 Drawing Sheets

METHOD FOR REMOVING METAL PIECES FROM GYPSUM BOARD WASTES

TECHNICAL FIELD

The present invention relates to a method for removing metal pieces from gypsum board wastes. More specifically, it relates to a method for removing metal pieces such as screws, nails and wires from gypsum board wastes containing these metal pieces efficiently.

BACKGROUND ART

Gypsum board wastes amount to about 1,500,000 tons each year in Japan. About 500,000 tons out of this is end materials and remainder materials generated from the production of gypsum boards, the construction of new buildings and the interior finish work of buildings, and gypsum board manufacturers recycle these materials. The remaining about 1,000,000 tons of the gypsum board wastes is wastes discharged from the remodeling and demolition of buildings. The wastes contain board body paper and metal pieces such as screws, nails and wires. Therefore, to recycle the wastes, foreign matter such as board body paper and metal pieces must be removed. However, as the process of removing the above foreign matter is too troublesome, the wastes are landfilled without being recycled.

When gypsum is contacted to water, it may produce hydrogen sulfide. Therefore, the gypsum board wastes must be placed in a controlled landfill, and its disposal cost poses a problem to be solved. In addition, the amount of gypsum board wastes is increasing each year, and an efficient pretreatment method for recycling gypsum board wastes is desired to cope with a shortage of landfill sites and reduce an environmental burden.

UP till now, some methods for removing metal pieces from gypsum board wastes have been proposed. The methods include one in which gypsum board wastes are crushed and the obtained crushed pieces are sieved to remove metal pieces on the sieve, and one in which a magnetic separator is used to magnetically adsorb metal pieces from crushed pieces of gypsum board wastes. However, according to these methods, when gypsum board wastes are to be crushed, a crushing machine may be broken by metal pieces contained in the wastes.

Then, methods for removing metal pieces from gypsum board wastes before crushing are under study. The methods include one in which a pendant magnetic separator is installed above the path for carrying gypsum board wastes to a crushing machine by means of an automatic carrier device and one in which a magnet pulley is provided on part of the carrier surface of an automatic carrier device. However, metal pieces on the lower side of each gypsum board waste cannot be removed in the former method and metal pieces on the upper side of the gypsum board waste cannot be removed in the latter method. That is, in these methods, the metal pieces on the upper or lower side of the gypsum board waste cannot be removed. To remove all metal pieces on the upper side and the lower side of the gypsum board waste by means of a magnetic separator, magnets of two systems must be installed by combining these methods, which is very uneconomical. Even when magnets of the two systems are installed by combining the above methods, metal pieces sandwiched between two gypsum boards placed one upon the other cannot be removed.

DISCLOSURE OF THE INVENTION

It is an object of the present invention to provide a method for removing metal pieces contained in gypsum board wastes efficiently before the gypsum board wastes are crushed so as to recycle them.

The inventors of the present invention conducted intensive studies to attain this object. As a result, they found that, in the method for removing metal pieces contained in gypsum board wastes by means of a drum magnetic separator, there is a certain relationship between the ratio of the drop height "h" and the cutting interval "D" of gypsum board wastes and the removal efficiency of metal pieces when the gypsum board wastes are dropped on the drum magnetic separator after they are cut. That is, they found that the metal pieces can be magnetically adsorbed and removed at an extremely high probability by controlling the value of the (h/D) ratio to a certain range regardless of the positions of the metal pieces contained in the gypsum board wastes.

The present invention was accomplished based on this finding.

The present invention relates to a method for removing metal pieces contained in gypsum board wastes from the gypsum board wastes by means of a drum magnetic separator, wherein the method comprises the step of dropping cut pieces obtained by cutting the gypsum board wastes at fixed intervals "D" at a drop height "h"; and the drop height "h" is 0.8 to 3 times the above interval "D".

BEST MODE FOR CARRYING OUT THE INVENTION

Figure 1:
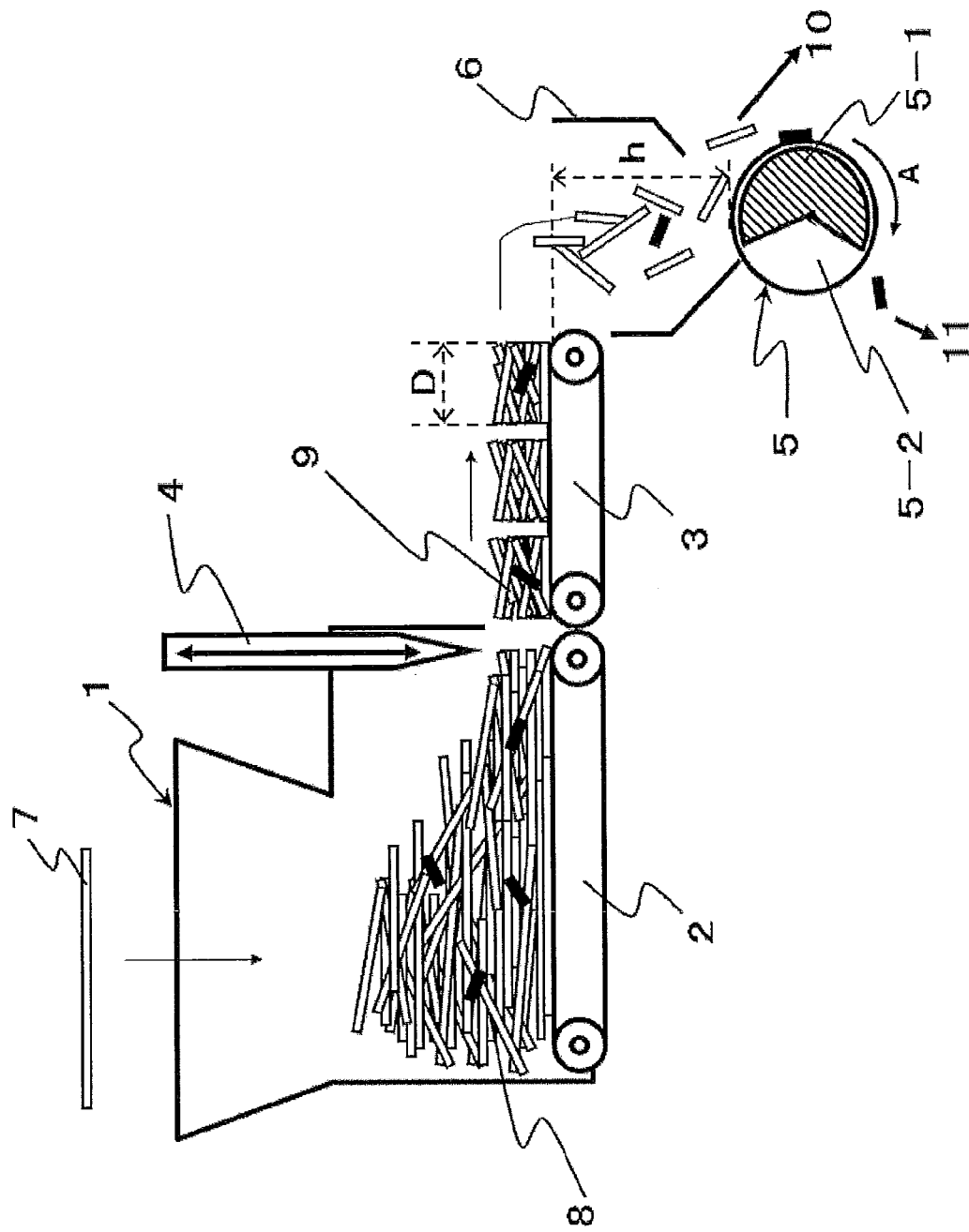
FIG. 1 is a schematic diagram of an example of an apparatus for carrying out the method of the present invention.

The method of the present invention is a method for removing metal pieces from gypsum board wastes. Therefore, any gypsum board wastes may be used in the present invention if they may contain metal pieces. The gypsum board wastes used in the method of the present invention include end materials or remainder materials generated from the construction of new buildings and the interior finish work of buildings; wastes discharged from the remodeling and demolition of buildings; and mixtures thereof.

In general, the gypsum boards have a structure that board body paper is attached to the surface of a gypsum cured product formed like a plate. The gypsum boards right after production have a thickness of about 9.5 to 25 mm and a width of about 450 to 1,250 mm. However, end materials, remainder materials and waste materials collected as gypsum board wastes generally have various sizes which are smaller than the above upper limit size. The method of the present invention can be used for any collected gypsum board wastes of various sizes. However, the method of the present invention is very effective when it is used for gypsum board wastes having a relatively large size. It is difficult to remove metal pieces contained in gypsum board wastes having a large size by known methods. The method of the present invention is particularly effective when it is used for gypsum board wastes having an area of 500 $cm^2$ or more.

The metal pieces which are contained in the gypsum board wastes and are to be removed by the method of the present invention are metal pieces which can be magnetically adsorbed to and removed by a drum magnetic separator. The metal pieces include nails, clamps, screws, wires, bolts, nuts, washers, springs and staples for staplers. Out of these, especially large metal pieces (metal pieces having a maximum length of 30 cm or more) which may cause a trouble in the step of cutting a gypsum board are preferably removed in advance as required.

The collected gypsum board wastes are first cut into pieces at fixed intervals "D". By cutting the gypsum board wastes at fixed intervals "D", the removal of the metal pieces by the present invention can be carried out stably. The value of the cutting interval "D" is not particularly limited and may be suitably determined in consideration of the removal accuracy of the metal pieces and injection efficiency into a crushing machine when the gypsum board wastes are crushed after the method of the present invention is carried out. The value of "D" is preferably 100 to 500 mm, more preferably 200 to 400 mm.

The cutting of the gypsum board wastes is preferably carried out as follows. The collected gypsum board wastes are first injected into the hopper. Then, the injected gypsum board wastes are discharged from the discharge port of the hopper by discharge means arranged at the bottom of the hopper. When the length of each of the gypsum board wastes projecting from the discharge port by this discharge becomes equal to the predetermined cutting interval "D", suitable cutting means in the proximity to the discharge port is activated to cut the gypsum board wastes.

In general, the collected gypsum board wastes vary in size and shape. Then, before the collected gypsum board wastes are injected into the hopper, the width of each of the gypsum board wastes is preferably adjusted so that it can be fit within the width of the discharge means. When the width of the collected gypsum board waste is larger than the width of the discharge means, the gypsum board waste should be cut to the same size as the width of the discharge means in advance.

Although the above discharge means is not particularly limited, a belt conveyor or a roller conveyor can be advantageously used. The width of the discharge means is not particularly limited. However, as the width of a gypsum board having highest versatility is 910 mm, the width of the discharge means is preferably 1,000 mm or more. By using discharge means having a width of 1,000 mm or more, gypsum board wastes having highest versatility can be discharged effectively without adjusting the width thereof in advance.

Discharge and cutting of the gypsum board wastes may be carried out to a single-layered gypsum board waste or a stack of the gypsum board wastes. The stack of the gypsum board wastes is preferably discharged and cut from the viewpoint of the improvement of throughput. The height of a stack of the gypsum board wastes maybe suitably determined in consideration of the ability of the cutting means, the size and strength of the magnetic separator and the ability of a crushing machine in use when the gypsum board wastes are crushed after the method of the present invention is carried out. This height may be, for example, 100 to 500 mm, preferably 200 to 400 mm. The height of a stack of the gypsum board wastes at the time of discharge and cutting can be controlled, for example, by adjusting the height of the discharge port of the hopper.

When the gypsum board wastes are cut according to the above preferred embodiment, the maximum length in the travelling direction of a cut piece after discharge and cutting is the above "cutting interval D".

The above cutting means is not limited to a particular type as long as it can cut a gypsum board. Examples of the cutting means in the present invention include a guillotine cutter, a slide cutter and a rotary saw. Out of these, a guillotine cutter is preferably used from the viewpoint of the protection of the cutting means. It is easy to set an interlock in the guillotine cutter. When foreign matter difficult to be cut is contained in the gypsum board wastes and load greater than a predetermined threshold value is applied, the emergency stop of the cutting means is made possible and the application of an excessive load to the cutting means can be prevented by setting the interlock. At the time of the emergency stop of the cutting means, the cutting means may be resumed after the removal of foreign matter.

Cut pieces of the gypsum board wastes cut at cutting intervals "D" are carried toward a drum magnetic separator by suitable carrier means. This carrier means may be identical to the above discharge means. The width of the carrier means is preferably equal to or larger than the width of the above discharge means so as to carry the cut pieces smoothly.

The collected gypsum board wastes and cut pieces thereof may contain foreign matter (such as wooden pieces, cloth pieces or resin pieces) besides the metal pieces which can be removed by the method of the present invention. It is desired that the above foreign matter should be removed in advance so as to reduce the load of the magnetic separator. Therefore, it is preferred to provide the step of removing the above foreign matter by means of a suitable method, for example, manually by visual inspection during conveyance by the above carrier means.

As for the size of the drum magnetic separator used in the present invention, the drum magnetic separator should have a magnet surface large enough to capture the dropped cut pieces. The width of the drum is preferably 1.5 to 2 times the width of the carrier means used in the previous step. Although the diameter of the drum is not particularly limited, it is preferably 20 to 50% of the cutting interval "D", for example, about 40 to 80 cm. Magnetic force which is the value of magnetic flux density on the surface of the drum is preferably 1,500 G or more. The revolution of the drum can be suitably adjusted according to the conveyance speed of the carrier means used in the previous step.

The cut pieces of the gypsum board wastes are then dropped on the drum magnetic separator from the end of the above carrier means so that metal pieces existent in the cut pieces are magnetically adsorbed and removed.

The biggest feature of the present invention is that after the gypsum board wastes are cut into pieces, the cut pieces are dropped on the drum magnetic separator and the values of the height "h" and the cutting interval "D" are relatively adjusted to ensure that the drop height "h" of the cut pieces becomes 0.8 to 3 times the cutting interval "D". When the cut pieces are dropped from the end of the above carrier means, this drop height "h" is defined as a vertical distance between the top surface of the carrier means and the top surface of the drum magnetic separator.

Each of the cut pieces falling from the end of the carrier means takes the following movement. When the cut piece is carried and reaches the end of the carrier means, the end of the cut piece projects into air from the end of the carrier means. This projection distance gradually increases by the operation of the carrier means. When the center of gravity of the cut piece moves outside the end of the carrier means, the cut piece cannot be situated stably on the carrier means and therefore falls while it turns with the end projecting into air thereof inclined in the downward direction. At this point, metal pieces on the upper side of the piece tumble out of the cut piece or slip off from the cut piece. Therefore, they can be magnetically adsorbed to the magnetic separator without being blocked by the cut piece. Metal pieces on the lower side of the cut piece fall directly and are magnetically adsorbed to the magnetic separator. Even when the cut pieces are stacked in layers and metal pieces are sandwiched between the cut pieces, each of the cut pieces of the stack turns so that the metal pieces can separate from the gap between the cut pieces and therefore can be magnetically adsorbed to the magnetic separator.

When the drop height "h" of the piece is set to 0.8 time or more the cutting interval "D", the cut piece can turn at a sufficiently large angle until it reaches the magnet surface so that metal pieces on the upper side of the cut piece can drop on the magnet surface of the magnetic separator. Even when cut pieces are stacked in layers, the cut pieces of the stack turn fully by ensuring the above height so that metal pieces existent between the cut pieces can drop on the magnet surface. When the drop height "h" is set to 1 time or more the cutting interval "D", the rotation angle of the falling cut piece can be increased, thereby making it possible to increase the probability of the magnetic adsorption and removal of the metal pieces. This is particularly effective when the cut pieces are stacked in layers.

To reduce damage to the magnet surface by a drop impact of the cut piece, the above drop height "h" is preferably 3 times or less, more preferably 2 times or less the cutting interval "D".

To enable the cut piece to drop on the drum magnetic separator without fail at the time of dropping the cut piece, a cover is preferably provided. This cover has at least an upper opening and a lower opening and may be composed of a wall material for defining these openings. The upper opening preferably has a width large enough to capture all the cut pieces which begin to fall from the end of the above carrier means. The width of the upper opening is preferably 1.5 to 4 times, more preferably 2 to 3 times the cutting interval "D". To enable the cut piece passing through the cover to drop on the magnet surface of the drum magnetic separator without fail, the opening width of the cover is preferably reduced halfway. The cover further has a lower opening so that the cut pieces dropped on the drum magnetic separator can be discharged swiftly.

By dropping the cut pieces as described above, the metal pieces existent in the cut pieces are magnetically adsorbed to the drum magnetic separator. The metal pieces magnetically adsorbed to the magnet surface of the drum magnetic separator move over the outer surface of the magnetic separator by the rotation of the outside drum of the drum magnetic separator and separate from the drum after they reach the area of a non-magnet surface to be collected.

The metal pieces contained in the collected gypsum board wastes can be removed from the gypsum board wastes with high accuracy as described above.

The gypsum board wastes treated by the method of the present invention are then crushed and recycled. Since the metal pieces contained in the gypsum board wastes are removed with high accuracy by the method of the present invention, the gypsum board wastes can reduce the load of the crushing machine used for crushing as much as possible.

The step of removing metal pieces remaining in the crushed pieces by further installing a suitable magnetic separator may be provided after this crushing step. This makes it possible to obtain reclaimed gypsum having high purity. When the crushed product is further crushed, the load of the crushing machine can be reduced as well.

The gypsum board wastes contain paper pieces or waste textile derived from board body paper in many cases. This foreign matter can be removed by a known method (for example, separation by a sieve).

A preferred embodiment of the method of the present invention will be described with reference to the accompanying drawings.

FIG. 1 shows an example of an apparatus preferred for the method of the present invention. The apparatus shown in FIG. 1 has a hopper 1, a discharge belt conveyor 2 as discharge means, a carrier belt conveyor 3, a guillotine cutter 4 as cutting means, a drum magnetic separator 5 and a cover 6. The drum magnetic separator 5 has a magnet body and a rotatable outside drum which is installed outside the magnet body. This magnetic separator 5 has a magnet surface 5-1 which has a center angle of about 240° and is arranged to cover almost all the drop area of the cut pieces. Denoted by 5-2 is a non-magnet surface.

The collected gypsum-board wastes 7 are stacked up in the hopper 1. This aligns the gypsum board wastes in the cross direction. The gypsum board wastes in stock are carried to the discharge port of the hopper by the discharge belt conveyor 2.

The discharge port of the hopper has an opening with a predetermined height, and the height of a stack of the gypsum board wastes to be discharged is adjusted by this opening.

The discharge belt conveyor 2 is activated intermittently and suspended each time the gypsum board wastes are carried a fixed distance "D". At this point, the gypsum board wastes project the distance "D" from the discharge port of the hopper. The guillotine cutter 4 is activated at this timing to cut the gypsum board wastes 7. The gypsum board wastes are cut into pieces 9 at fixed intervals "D" by repeating the process consisting of the activation for the distance "D" and suspension of the discharge belt conveyor 2 and the activation of the guillotine cutter 4. The cut pieces 9 shown in FIG. 1 are stacked in layers and the height of this stack is adjusted by the height of the discharge port of the hopper. In this case, the gypsum board wastes stacked in layers and projecting from the discharge port of the hopper are cut at the same time by the activation of the guillotine cutter 4.

The cut pieces 9 are carried by the carrier belt conveyor 3. The carrier belt conveyor 3 may be activated intermittently in association with the discharge belt conveyor 2, or continuously. During the conveyance of the cut pieces 9 by the carrier belt conveyor 3, wooden pieces existent in the cut pieces 9 may be removed by a suitable method. When the cut pieces 9 carried by the carrier belt conveyor 3 reach the end (right end in FIG. 1) of the carrier belt conveyor 3, they drop on the magnet surface 5-1 of the drum magnetic separator 5 while they turn round. Thereby, metal pieces 11 existent in the cut pieces 9 are magnetically adsorbed to the magnet surface 5-1 and removed from the cut pieces 9. The metal pieces 11 are moved in a direction A by the rotation of the outside drum of the drum magnetic separator 5 and separate from the drum to be collected when they reach the non-magnet surface 5-2.

The drop height "h" of the cut pieces 9 is adjusted to 0.8 to 3 times the cutting interval "D" of the cut pieces 9. This height "h" is defined as a vertical distance between the carrier surface of the carrier belt conveyor 3 and the top surface of the drum magnetic separator 5. By setting the height "h" to the above range, even when the cut pieces 9 are in a single layer or multiple layers, the metal pieces drop on the magnet surface without fail and the drum magnetic separator 5 can be prevented from being damaged by a drop impact. FIG. 1 typically shows that the cut pieces 9 are falling while they are turning round.

The apparatus shown in FIG. 1 has the cover 6 for ensuring that the cut pieces 9 drop on the magnet surface 5-1 of the drum magnetic separator 5 from the end of the carrier belt conveyor 3 accurately. The width of the upper opening of the cover 6 is about 2.5 times the length of each cut piece (cutting interval "D") and the width of the cover 6 is reduced halfway to ensure that the cut pieces passing through the cover drop on the magnet surface of the drum magnetic separator 5 without fail. The cover 6 further has a lower opening so that the cut pieces dropped on the drum magnetic separator 5 can be discharged swiftly. This cover 6 ensures that all the cut pieces 9 and all the metal pieces 11 existent in the cut pieces 9 drop on the magnet surface 5-1 of the drum magnetic separator 5 and that the metal pieces 11 are magnetically adsorbed and removed.

The cut pieces 9 from which the metal pieces 11 have been removed are then injected into a crushing machine 10 (not shown) as required for post-processing.

Figure 2:
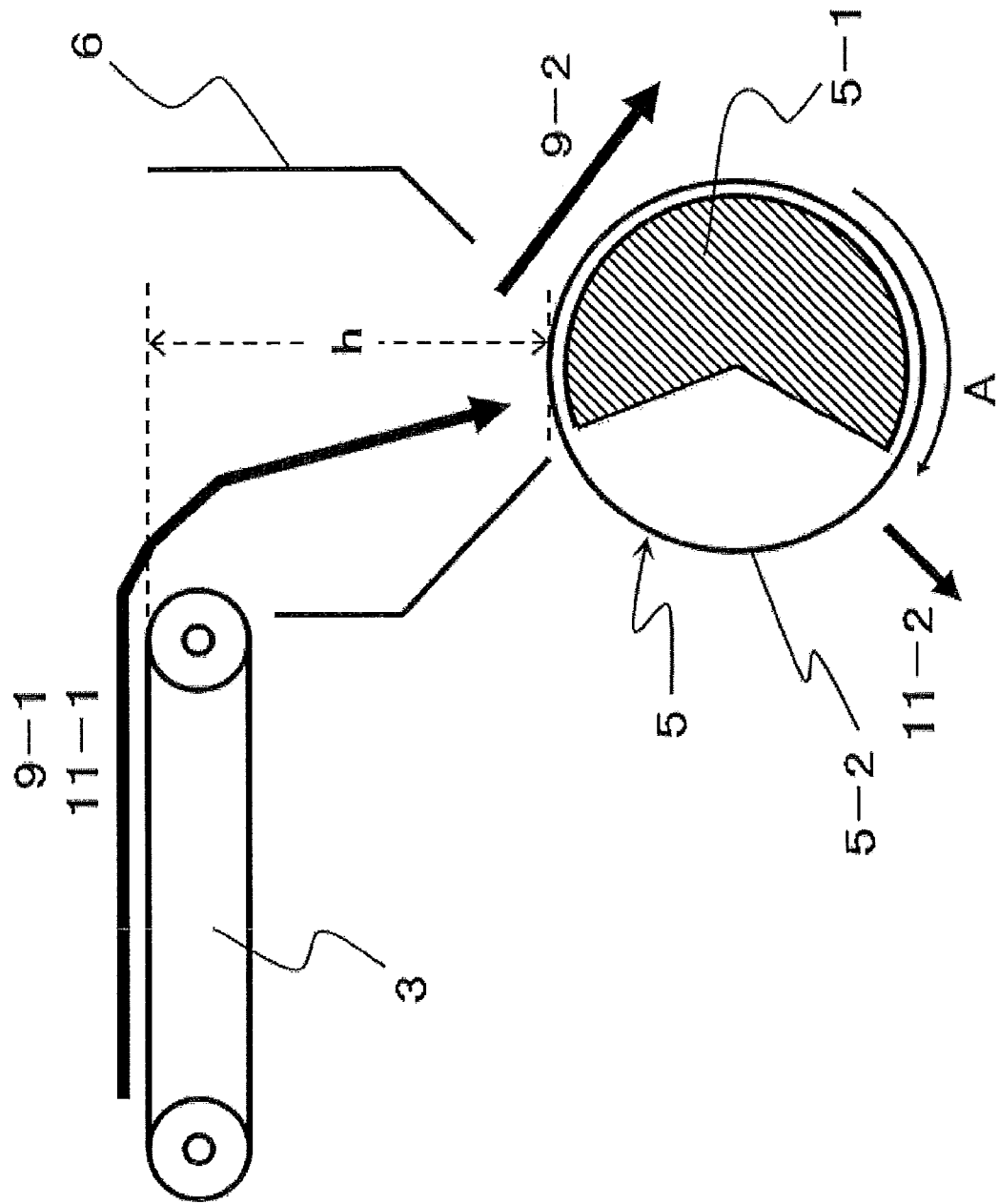
FIG. 2 is an enlarged diagram showing part of the apparatus in FIG. 1.

The definition of the drop height "h" in the apparatus shown in FIG. 1 is explained with reference to FIG. 2. FIG. 2 is an enlarged view of the carrier belt conveyor 3, the drum magnetic separator 5 and the cover 6 of of the apparatus shown in FIG. 1 as well as flows of the cut pieces 9 and flows of the metal pieces 11 denoted by bold arrows. The drop height "h" in the apparatus shown in FIG. 1 is the difference between the height of the carrier surface of the carrier belt conveyor 3 and the height of the top of the outside drum of the drum magnetic separator 5.

The effect of the present invention is obtained by setting the height "h" defined as described above to 0.8 to 3 times the cutting interval "D" of the cut pieces 9. That is, the cut pieces 9 of the gypsum board wastes and the metal pieces 11 existent in the cut pieces 9 are carried together by the carrier belt conveyor 3 and dropped on the outside drum of the drum magnetic separator 5 from the end of the conveyor at a drop height "h" (flows 9-1 and 11-1). The dropping of the cut pieces 9 and the metal pieces 11 on the magnetic separator 5 is ensured by the cover 6. The cut pieces 9 drop from a height "h" while they turn round. By this movement, the metal pieces 11 separate from the upper side or the lower side of each of the cut pieces 9 or from the gap between the cut pieces 9 and are magnetically adsorbed to the magnet surface 5-1 of the drum magnetic separator 5 to be removed. The cut pieces 9 from which the metal pieces 11 have been removed are discharged from the lower opening of the cover 6 and supplied to the next step (for example, the crushing step) (flow 9-2). The metal pieces 11 magnetically adsorbed to the magnet surface 5-1 move in the direction A by the rotation of the outside drum and separate from the drum to be collected (flow 11-2) after they reach the area of the non-magnet surface 5-2.

EFFECT OF THE INVENTION

According to the method of the present invention, even when the metal pieces contained in the gypsum board wastes are existent on either the upper or lower side of each of the gypsum board wastes, the metal pieces can be removed efficiently by installing only one magnet. Particularly when gypsum board wastes are stacked in layers and metal pieces are existent between the layers, the metal pieces can be removed with high accuracy.

As a result, when the gypsum board wastes are crushed after the removal of the metal pieces, the probability of the existence of the metal pieces in the step of crushing is greatly reduced. Therefore, since the number of times of emergency suspension of the crushing machine due to the excessive load of the crushing machine by remaining metal pieces is significantly reduced, the disposal capacity of the gypsum board wastes is remarkably improved.

EXPLANATION OF SYMBOLS

1: hopper
2: discharge belt conveyor
3: carrier belt conveyor
4: guillotine cutter
5: drum magnetic separator
5-1: magnet surface
5-2: non-magnet surface
6: cover
7: collected gypsum board wastes
8: gypsum board wastes
9: cut pieces of gypsum board wastes
9-1, 9-2: flow of cut pieces of gypsum board wastes
10: crushing machine (not shown)
11: metal pieces
11-1, 11-2: flow of metal pieces
A: rotation direction of outside drum of drum magnetic separator
D: cutting interval of gypsum board wastes
h: drop height

The invention claimed is:

1. A method for removing metal pieces contained in gypsum board wastes from the gypsum board wastes by means of a drum magnetic separator, wherein
   the method comprises the step of dropping cut pieces obtained by cutting the gypsum board wastes at fixed intervals "D" on the drum magnetic separator at a drop height "h"; and the drop height "h" is 0.8 to 3 times the interval "D".

2. The method according to claim 1, wherein the cut pieces of the gypsum board wastes are obtained by cutting the gypsum board wastes carried over an automatic carrier device by means of a guillotine cutter which is activated each time the conveyance distance of the carrier device becomes "D".

3. The method according to claim 1, wherein the cut pieces of the gypsum board wastes before they drop on the drum magnetic separator are stacked in layers.

4. The method according to claim 2, wherein the cut pieces of the gypsum board wastes before they drop on the drum magnetic separator are stacked in layers.

* * * * *